March 10, 1925. 1,529,543
E. F. HATHAWAY
SELF LOCKING BEARING FOR YARN SPOOLS
Filed Sept. 28, 1922
Fig. 1.
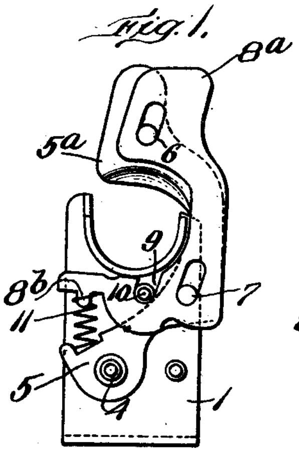
Fig. 2.
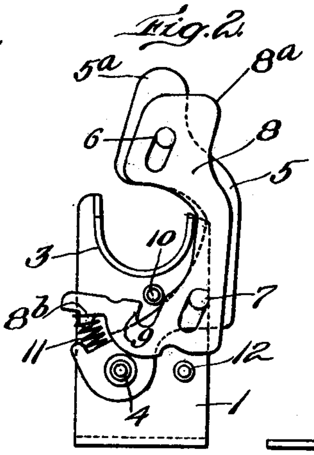
Fig. 3.
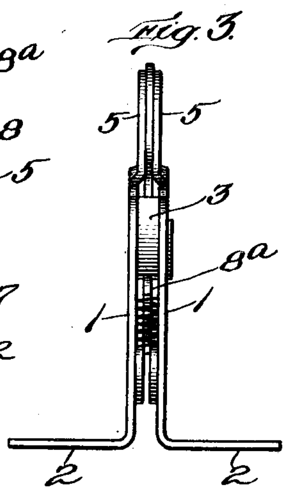
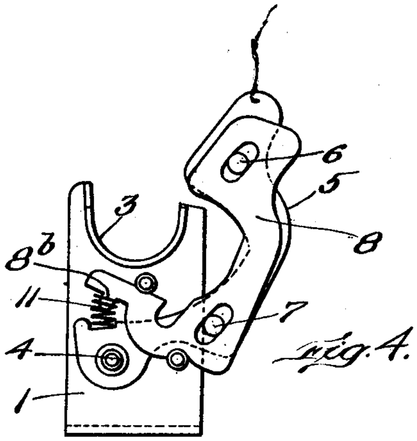
Fig. 4.
Inventor:
E. F. Hathaway
by
Geo. N. Goddard, atty.

Patented Mar. 10, 1925. 1,529,543

UNITED STATES PATENT OFFICE.

EDGAR F. HATHAWAY, OF WELLESLEY, MASSACHUSETTS, ASSIGNOR TO SHAWMUT ENGINEERING COMPANY, OF BOSTON, MASSACHUSETTS, A CORPORATION OF MASSACHUSETTS.

SELF-LOCKING BEARING FOR YARN SPOOLS.

Application filed September 28, 1922. Serial No. 591,170.

To all whom it may concern:

Be it known that I, EDGAR F. HATHAWAY, a citizen of the United States, and resident of Wellesley, in the county of Norfolk and State of Massachusetts, have invented certain new and useful Improvements on Self-Locking Bearings for Yarn Spools, of which the following is a specification.

This invention relates to bearings for the retention of the journals of yarn spools such as are used in tube frames forming part of an Axminster loom for weaving tufted fabrics, and is intended to provide a bearing for the yarn spool that shall be securely locked against displacement when the spool is in service and yet be capable of being easily released with the same hand and with practically one motion of the hand when the operator desires to open the bearing for the purpose of removing or inserting the spool journal. With these objects in view the invention in a general way, comprises two co-acting pivotally connected bearing members provided with opposed journal-receiving and engaging portions disposed to form a supporting bearing capable of being opened for the reception or removal of the spool journal or shaft combined with a self-locking slide or detent arranged to positively hold the bearing against accidental displacement.

This and other features of the invention will be particularly explained in the following specification and will be defined in the claims hereto annexed.

In the accompanying drawings I illustrate a simple and convenient form embodying the principles of this invention, in which:

Figure 1 is a side elevation showing one form of the device in closed position with one of each pair of the bearing members removed to show the locking detent.

Figure 2 is a similar view showing the locking detent shifted to releasing position against its spring tension.

Figure 3 is a front elevation showing the completely assembled device.

Figure 4 is a view similar to Figure 2 showing the bearing in open position.

In the practice of this invention, according to the form illustrated, I provide a fixed bearing member comprising preferably two parallel pressed metal plates 1, provided with semi-circular recesses at their upper ends in which is secured a semi-cylindrical bearing plate 3 and provided at their lower ends with offset flanges or feet 2, forming supporting bases for securing the members with the carrier bar or other support.

The standards or fixed members 1, carry a transverse pivot pin 4, which serves as a fulcrum for a rotating bearing member 5, which is formed with an extension 5ª, to overhang the above-mentioned bearing recess in position to prevent the removal of the journal when the movable bearing member 5 is swung to position to close the bearing.

The movable bearing members 5 carry two transverse guide pins 6 and 7 which pass through parallel slots in a slide plate or locking member 8 which locking member is provided with a notch or recess 9 located so as to engage or take over the locking pin 10, carried by the standards 1. A short projection or tongue 8ª, serves to receive and position a thrust spring 11 whose other end abuts against recesses or notches formed in the adjacent edge portions of the members 5, so as to normally force the slotted slide plate or detent upward to form a locking engagement between the notch 9 and the fixed pin 10, as shown in Figure 1.

It will thus be seen that the locking slide or detent carried by the journal-retaining members 5 is normally spring-pressed into locking engagement with the pin 10 when the bearing is closed to retain the journals in place, and, although spring-actuated, forms a positive lock by reason of the fact that any stress exerted by the journal in movement from its bearing seat has no tendency to unlock or release the detent. The detent slide 8, has its free end carried out to form a projection 8ᵇ beyond and behind the pivoted bearing member 5ª so that as the finger is placed against the journal-retaining bearing member 5ª, preparatory to opening the bearing the thumb may be pressed against the end or extension 8ᵇ of the slide to force the slide back against its yielding spring so as to disengage the notch 9 from the locking pin 10, thereby leaving the pivoted bearing member free to open by the upward or backward pressure of the finger. On the other hand, it will be observed that since the direction of releasing movement of the detent slide is toward the pivot pin 4, an accidental blow against the end of the slide that would tend to temporarily release the slide does not tend to open the bearing so that the slide can return to locking position without opening the bearing. A blow in the direction proper to open the bearing as the tube frame is carried along by its suspension chains, will not operate to release the slide. By this construction and arrangement, therefore, the spool journal is securely locked at all times against accidental displacement and yet is capable of being released and opened by the application of the finger and thumb of one hand, leaving the other hand of the operator free to handle the yarn spool which is a great desideratum in expediting the manipulation of the device.

What I claim is:

1. A journal bearing for a yarn spool or the like embracing in its construction coacting pivotally connected bearing members combined to form a separable journal-inclosing bearing and a locking detent mounted on one of said members to swing therewith and arranged in such relation to the free end of its carrying member as to be released from locking position by pressure in a direction toward the centre of the bearing, whereby the detent releasing pressure does not tend to open the bearing, substantially as described.

2. In a self-locking bearing for a spool journal, the combination of a fixed bearing member adapted to receive the spool journal, a cooperating member pivotally mounted on one side of the journal and extending forward to overhang the opposite side of the journal, a latch movable transversely of the journal axis and arranged to also overhang the front side of the journal and automatically slidable into releasable engagement with a fixed stop to positively prevent the journal from opening the pivotally mounted journal bearing member by exerting pressure against the latter, substantially as described.

3. In a self-locking bearing for a spool journal, the combination of fixed and movable journal-retaining members pivotally connected together to form a separable bearing for the reception of a journal, a self-locking latch slidably mounted on the pivotal bearing member to move transversely of the journal axis into engagement with a fixed stop when the pivotal member is in closed bearing position and thereby positively but releasably lock the pivotal member against opening under pressure exerted by the journal, substantially as described.

4. In a self-locking bearing for a spool journal, the combination of fixed and movable journal-engaging and retaining members pivotally connected to form a separable journal bearing, a spring pressed latch slidably mounted on the pivotal member in position to engage a fixed stop when the bearing is closed, thereby positively locking the pivotal journal-retaining member against opening under pressure exerted by the journal, the forward end of said latch being located in juxtaposition to the free end of said pivotal member to permit the latch to be released from locking position by the hand that opens the bearing.

5. A self-locking bearing for a tube frame spool embracing in its construction a fixed bearing member provided with an open bearing recess for reception of a spool journal, a movable member mounted on a pivotal centre beyond the closed side of the bearing recess, and having its free end extended to overhang the open side thereof, a locking member carried by and slidable on said movable member transversely of the bearing axis with its manually operated end in close proximity to the free end of said movable member, and a spring acting to normally press said locking member into positive but releasable engagement with the fixed member to hold the movable member unyieldingly in retaining position, substantially as described.

6. A self-locking bearing for a tube frame spool embracing in its construction a fixed standard provided with a bearing recess for a spool journal, a pivotal journal-retaining member connected therewith, a spring-pressed locking member having slotted connection with said pivotal member to allow to and fro movement, a thrust spring arranged to normally force said locking member into positive locking engagement with the fixed standard while yielding under pressure to allow the release of the locking member to permit the journal-retaining member to move to open position, substantially as described.

In witness whereof, I have subscribed the above specification.

EDGAR F. HATHAWAY.